Nov. 8, 1927.
E. R. EVANS
1,648,168
VEHICLE BRAKE MECHANISM
Filed Sept. 4, 1923   4 Sheets-Sheet 1
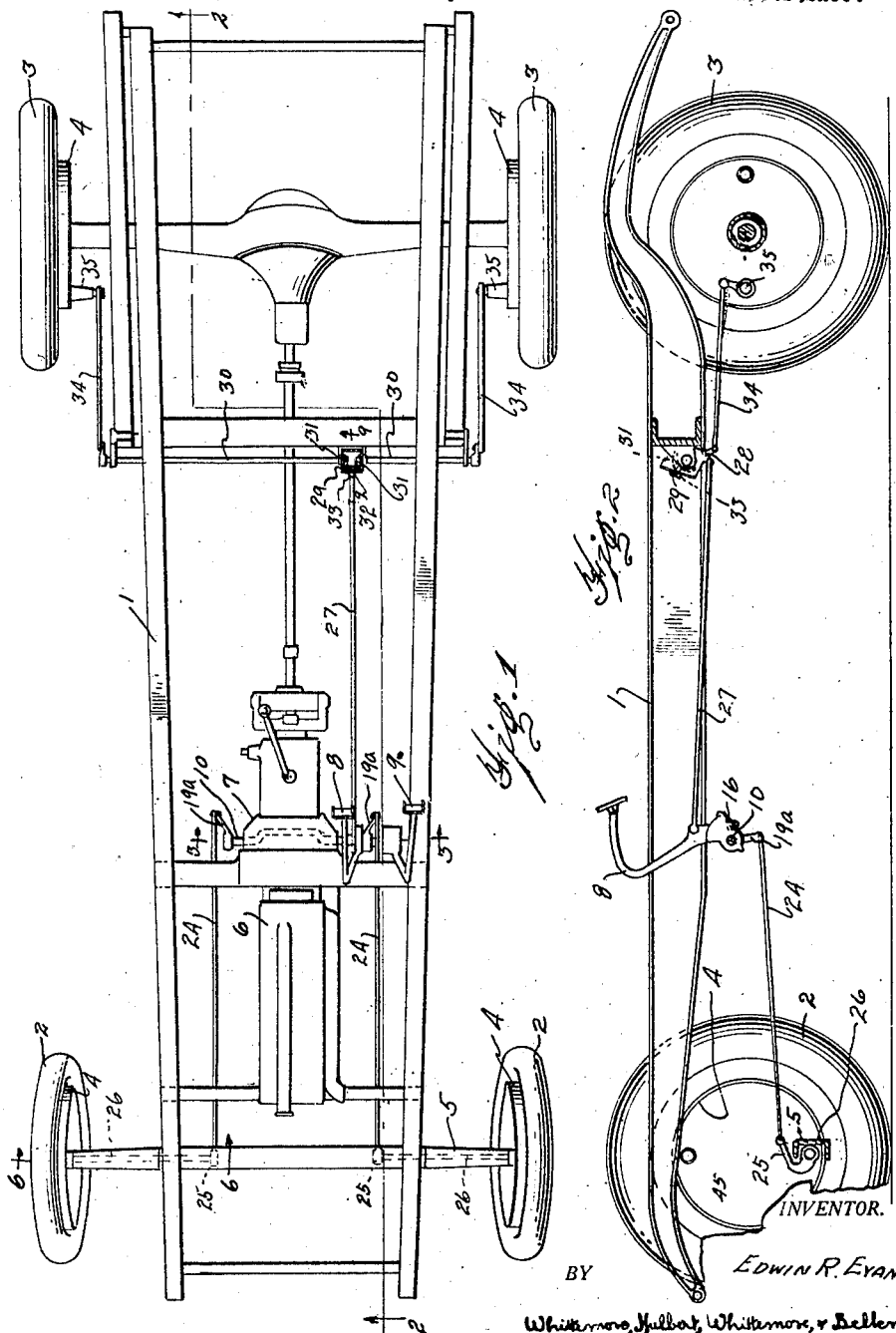
INVENTOR.
*Edwin R. Evans*
BY
*Whittemore, Hulbert, Whittemore, & Belknap*
ATTORNEYS

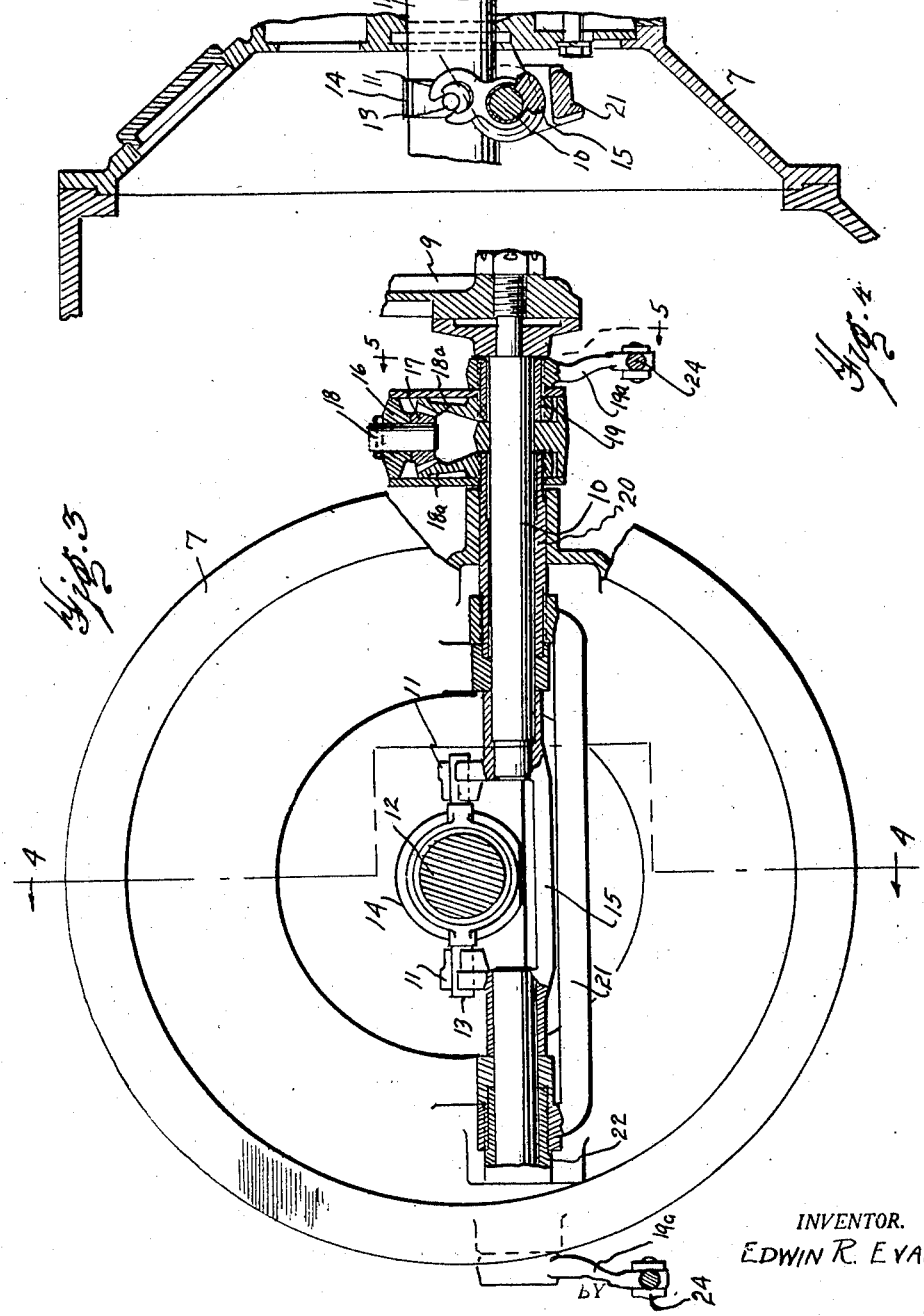

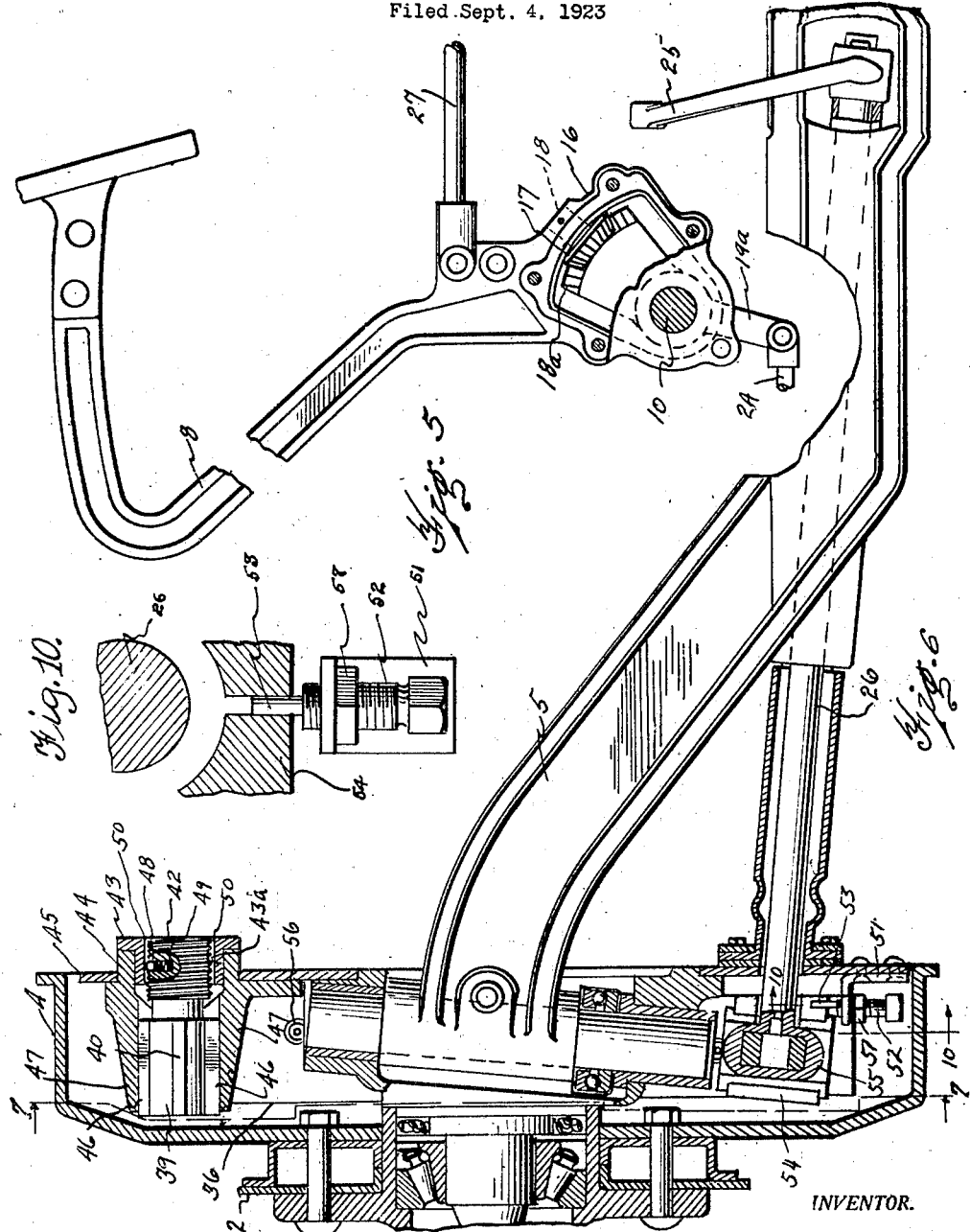

Nov. 8, 1927.
E. R. EVANS
1,648,168
VEHICLE BRAKE MECHANISM
Filed Sept. 4, 1923    4 Sheets-Sheet 4
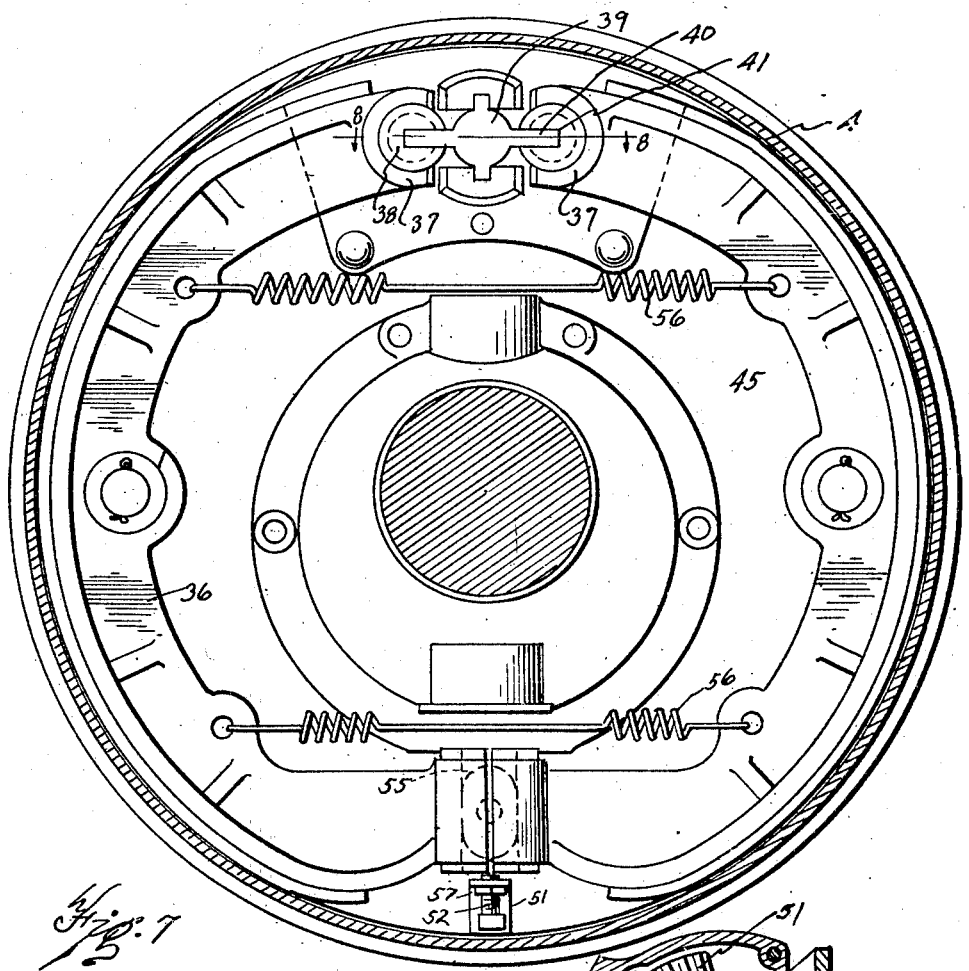
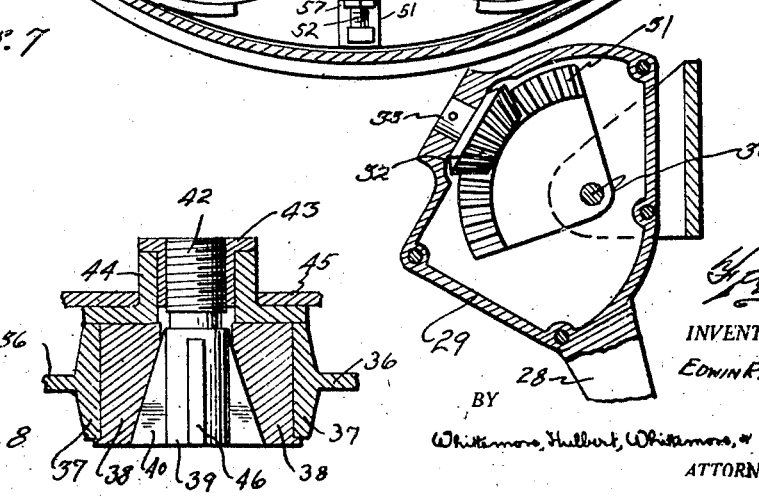
INVENTOR.
Edwin R. Evans
BY
Whittemore, Hulbert, Whittemore, & Belknap
ATTORNEYS Patented Nov. 8, 1927.

1,648,168

UNITED STATES PATENT OFFICE.

EDWIN R. EVANS, OF DETROIT, MICHIGAN.

VEHICLE BRAKE MECHANISM.

Application filed September 4, 1923. Serial No. 660,855.

This invention relates to vehicle brake mechanisms and particularly relates to mechanisms including both front and rear wheel brakes.

The invention consists in a provision for properly proportioning the braking forces applied to the several wheels from a common controlling member, in a novel relation between the clutch control and brake control mechanisms, and further consists in a provision for adjustment of the brake shoes compensating for wear, and in a provision for properly centering brake shoes or the like within a brake drum.

In the drawings:—

Figure 1 is a plan view of a vehicle chassis equipped with the improved brake mechanism;

Figure 2 is a sectional view of the same on line 2—2 of Figure 1;

Figure 3 is a cross section on line 3—3 of Figure 1 showing the relation of the clutch control and the brake control mechanisms;

Figure 4 is a vertical sectional view of the same on line 4—4 of Figure 3;

Figure 5 is a section on line 5—5 of Figure 3 showing primarily the brake control pedal and connected parts;

Figure 6 is a section on line 6—6 of Figure 1 showing one of the front wheel brake mechanisms;

Figure 7 is a vertical section on line 7—7 of Figure 6;

Figure 8 is a section on line 8—8 of Figure 7 showing the adjustable mounting for the brake shoes;

Figure 9 is a detail sectional view taken upon line 9—9 of Figure 1 showing mechanism for equalizing the braking force transmitted to the two rear wheels.

Figure 10 is a vertical section on line 10—10 of Figure 6, showing a provision for centering the brake shoes with respect to the drum.

In these views the reference character 1 designates the frame of a motor vehicle and 2 and 3 the front and back wheels thereof, each of said wheels being provided with a brake drum 4. 5 is the front axle, 6 the engine, 7 the clutch housing, 8 the brake control pedal and 9 the clutch control pedal. The pedal 9 is mounted fast upon one end of a rock shaft 10 which is mounted in the clutch housing 7 and within said housing carries a pair of lugs 11 upstanding at opposite sides of the transmission shaft 12 to engage trunnions 13 upon the clutch release collar 14. Preferably the shaft 10 comprises portions at opposite sides of the transmission shaft 12 and rigidly connected by a yoke member 15 which is downwardly offset to clear the shaft 12 and collar 14. The lower end portion of the brake control pedal 8 forms a casing 16 which is journaled upon the shaft 10 between the clutch pedal lever 9 and the housing 7. Within said casing, a bevelled pinion 17 is journaled upon a stub shaft 18 carried by said casing in a radial relation to the shaft 10. Said pinion is oppositely engaged, within said casing, by segmental bevel gears 18ª, one of which is fast upon a short tubular shaft 19 journaled upon the shaft 10 exteriorly of the housing 7, one of the front brake control levers 19ª also being fast upon said tubular shaft. The other gear 18ª is fast upon a longer tubular shaft 20 also journaled upon the shaft 10 and extending into said housing. A yoke bar 21 offset downwardly below the yoke 15 rigidly connects the shaft 20 with a tubular shaft 22 journaled upon the shaft 10 at the opposite side of the transmission shaft 12, said shaft 22 projecting exteriorly of the casing 7 to mount the other front brake control lever 19ª. The levers 19ª are pivotally engaged by the rods 24 which extend forwardly to pivotally engage arms 25 upon the cam shafts 26 of the front wheel brakes. The brake control foot lever 8 is adapted to actuate the rear brakes through a pull rod 27 pivoted to said lever just above the gear casing 16. Said rod extends rearwardly to engage an arm 28 integrally depending from a casing 29 journaled upon the adjacent ends of two aligned rock shafts 30 mounted transversely of the frame 1. Within the casing 29, the shafts 30 rigidly carry gear segments 31 which mesh with a bevel pinion 32 journaled between said segments upon a stud shaft 33 carried by the casing 29. The outer ends of the rock shafts 30 are respectively connected by pull rods 34 to the cam shafts 35 of the rear brakes.

Considering now the operation of the invention as so far described, upon actuation of the foot lever 8, the resultant rocking of the casing 16, rigidly carried by the lower end of said lever, causes the pinion 17, carried by said casing to form through its engagement with the gear segments 18ª a means for subjecting said segments to an equalized rocking movement. As is well understood, the pinion 17 will adjust itself relative to the segments 18ᵃ so as to equalize the effort transmitted through each of said segments. This equalized effort is transmitted from said segments through the pull rods 24 to the front brakes. The concentric mounting of the brake shafts 20 and clutch shaft 10 simplifies the mechanism and further produces a compact unit assembly for the main clutch and brake rock shafts. This assembly is made possible primarily by employment of the offset connections 15 and 21 between the portions of said shafts at opposite sides of the engine shaft.

Equalization of the braking effect acting upon the two front wheels and a similar equalization as regards the rear brakes is assured by the gearings 17, 18ᵃ and 31, 32. There will presently be described a provision for equalization of the total efforts applied to the front and rear wheel brakes or establishment of a desired proportion between said efforts.

Describing now the specific mounting of the brake shoes of each brake, 36 designates a pair of complementary semi-circular brake shoes interiorly engageable with each drum 4. The upper ends of said shoes are formed with adjacent pivot bearings 37 in which are respectively engaged cylindrical pivot members 38. As is best seen in Figure 7, said bearings have openings in their opposings faces, said openings being of a lesser transverse extent than the interior diameter of the bearings so that the pivot members 38 cannot escape from the bearings through said openings. Between said bearings there is mounted a wedge member comprising a cylindrical body 39 having diametrically opposed ribs 40, the edges of which incline oppositely to the axis of the wedge member. Said ribs project through the lateral openings in the bearings 37 and engage in grooves 41 respectively formed in the pivot members 38, said grooves having their bottom faces inclined correspondingly to the edge faces of said ribs. The wedge body 39 has a threaded extension 42 engaged by an adjusting nut 43 mounted in a supporting bracket 44. The latter is secured to a plate 45 forming a closure for the brake drum. The wedge body is formed with upwardly and downwardly projecting splines 46 which engage in spline ways 47 formed as integral projections from the bracket 44, above and below the wedge member and between the bearings 37. Thus the wedge member is held from rotation but is free to slide in parallelism with the pivotal axes of the two brake shoes responsive to tightening of the adjusting nut 43. The effect of such tightening is to enter the wedge member 39, 40 increasingly between the pivot members 38 so as to force the latter apart. The described construction is such that the two brake shoes may turn freely upon the pivot members 38, the latter, however, being restrained by the wedge ribs 41 from any rotation.

In properly proportioning the total front and rear braking effort the nuts 43 are first all tightened so as to firmly engage the brake shoes with the brake drums. If it be desired to equalize the front and rear braking effort all of said nuts are then loosened to the same extent or the nuts of the front and rear brakes may be differentially loosened to establish a desired proportion between the front and rear braking efforts. A ball detent 48 bears upon the sleeve portion 43ᵃ of the nut and under stress of a spring 49 snaps into sockets 50 circumferentially spaced in said sleeve portion and serves both to retain the nut against accidental turning and to indicate to the operator a definite fractional part of a turn.

There is shown in Figures 6 and 7, and in detail in Figure 10 a provision for adjusting the brake shoes to a properly centered non-braking position within the brake-drum. Thus 51 is an angular bracket secured to the plate 45 within the bottom portion of the brake drum below the cam shaft 26. With said bracket a vertical adjusting screw 52 has threaded engagement, the lower end of said screw being headed. Upon its upper end said screw eccentrically carries an upstanding pin 53 which fits snugly between heads 54 respectively formed upon the lower ends of the brake shoes 36. Said heads are vertically channeled to jointly form a cylindrical chamber to receive the cam 55 which is carried by the shaft 26. If upon initial assembly it is found that the position of the brake shoes established by their engagement with the cam 55 does not properly center said shoes relative to the drum 4, correction is made by rotatively adjusting the screw 52 so as to cause the pin 53, eccentric thereupon to bear upon one or other of the shoes so as to move the same, together with the cam 55 to a central location within the drum. The two shoes will move as a unit because of their being drawn together upon the cam 55 by their springs 56, and there is a sufficient free length of the shaft 26 between its bearing and the cam 55 to allow such slight flexing as may be necessary to permit the cam to be adjusted laterally in unison with the shoes as described. A locking nut 57 engaging the screw 52 beneath the bracket 51 bears upon the latter to lock the screw in adjustment.

What I claim as my invention is:—

1. The combination with a brake drum and a coacting brake shoe having a pivot bearing formed with a lateral opening of lesser transverse extent than the interior diameter of said bearing, a pivot member engaging in said bearing, and a wedge registering with said lateral opening engaging said pivot member and adjustable parallel to the axis of said member for shifting said bearing toward the drum.

2. The combination with a brake drum, of a pair of brake shoes interiorly engageable with said drum, adjacent pivot members respectively engaging said shoes, a wedge between said pivot members, a support within which said wedge is adjustable to force said pivot members apart, and means carried by said support projecting between the two brake shoes and restraining the wedge from turning.

3. The combination with a brake drum, of a pair of brake shoes interiorly engageable with said drum, adjacent pivot members respectively engaging said shoes, a wedge between said pivot members coacting therewith, a support within which said wedge is adjustable to force said pivot members apart, and members projecting from said support respectively above and below said wedge and restraining the latter from turning.

4. The combination with a brake drum, of a pair of brake shoes interiorly engageable with said drum and having adjacent pivot bearings formed with opposed lateral openings of lesser transverse extent than the interior diameter of said bearings, a pair of pivot members engaging said bearing, a wedge between said pivot members acting upon the latter in registration with said lateral openings, and means for adjusting said wedge parallel to the axes of said pivot members for spreading said members apart.

5. The combination with a brake drum, of a pair of brake shoes interiorly engageable with said drum and having adjacent pivot bearings formed with opposed lateral openings of lesser transverse extent than the interior diameter of said bearings, a pair of pivot members engaging in said bearings, and means between said pivot members for supporting the latter and for adjusting the same from each other.

6. The combination with a brake drum, of a pair of brake shoes interiorly engageable with said drum and having adjacent pivot bearings formed with opposed lateral openings, a pair of pivot members engaging said bearings and formed with longitudinal grooves in opposed relation, a wedge engaging in the grooves of said pivot members for spreading the latter, said wedge having a threaded supporting stem, a support in which said wedge is adjustable to act upon the pivot members, a nut engaging said threaded stem and bearing upon said support to adjust the wedge, a spline upon said wedge, and a projection from said support between the brake shoes engaging said spline to restrain the wedge from turning.

7. The combination with a brake drum and a brake shoe pivoted at one end within said drum, of means associated with the other end of said shoe for actuating said shoe into braking contact with the drum, and supplementary means adjacent said actuating means comprising a bracket fixed to a stationary part and a member movably carried by the stationary part for adjusting the brake shoe about its pivot to regulate the normal spacing of the shoe from the drum.

8. The combination with a brake drum and a pair of complementary brake shoes interiorly engageable with said drum, and having adjacent ends, and means between said ends for alternatively exerting pressure upon said ends.

9. The combination with a brake drum and a pair of complementary brake shoes interiorly engageable with said drum and having adjacent ends, of a centering member for said shoes between said ends and bodily movable to or from either end.

10. The combination with a brake drum and a pair of complementary brake shoes interiorly engageable with said drum and having adjacent ends, of a rotatively adjustable member having an eccentric projection engageable between said ends and adapted to alternatively exert pressure on said ends through rotation of said member to center the shoes within the drum.

11. In a brake mechanism, the combination with brake drums respectively carried by the four wheels of a vehicle, and a pair of brake shoes adjacently pivoted in each drum, of a common actuating mechanism for said shoes, and common means associated with each wheel for alternatively adjusting the ends of the shoes of each brake apart to compensate for wear and to predetermine the relative braking forces applied at the several wheels.

12. In a brake mechanism, the combination with brake drums respectively associated with the four wheels of a vehicle, of braking members respectively engageable with said drums, a common actuating mechanism for said braking members, a single adjusting member associated with each wheel for selectively acting on each of said brake members for effecting a full engagement of said member with the drum and a measured withdrawal from the drum.

13. The combination with a drum and complementary brake shoes internally engageable therewith, of a·means normally retracting said shoes clear of said drum, and a member adjustable to selectively act on the shoes to vary response of said shoes to said retracting means.

14. The combination with a brake drum and a pair of complementary brake shoes internally engageable with said drum, of means normally retracting said shoes clear of said drum, and a member adapted to exert pressure alternatively on said shoes to limit response thereof to said retracting means.

15. The combination with a plurality of brake shoes and means for exerting a thrust upon said shoes to actuate the same, of means urging said shoes yieldably towards the actuating means and means selectively engageable with said shoes for limiting movement of the shoes towards the actuating means.

In testimony whereof I affix my signature.

EDWIN R. EVANS,